US008567550B2

(12) United States Patent
Kim

(10) Patent No.: US 8,567,550 B2
(45) Date of Patent: Oct. 29, 2013

(54) BOOSTER ASSEMBLY FOR VEHICLES

(75) Inventor: Tae Hwan Kim, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/397,408

(22) Filed: Feb. 15, 2012

(65) Prior Publication Data

US 2012/0205180 A1 Aug. 16, 2012

(30) Foreign Application Priority Data

Feb. 15, 2011 (KR) ........................ 10-2011-0013065

(51) Int. Cl.
*B60K 26/00* (2006.01)

(52) U.S. Cl.
USPC ......................................... 180/315; 92/169.3

(58) Field of Classification Search
USPC ................. 180/315; 60/547.1, 593, 376 R; 92/169.1, 169.2, 169.3; 285/405; 403/321, 325, 326, 332
See application file for complete search history.

(56) References Cited

U.S. PATENT DOCUMENTS

| 2,021,241 | A | * | 11/1935 | Mall .............................. 285/276 |
| 2,672,015 | A | * | 3/1954 | Adams ............................. 60/559 |
| 4,256,016 | A | * | 3/1981 | Thomas ........................ 91/369.2 |
| 4,270,438 | A | * | 6/1981 | Thomas et al. .................... 91/49 |
| 4,328,738 | A | * | 5/1982 | Hamamatsu ................. 91/376 R |
| 4,330,996 | A | * | 5/1982 | Becht et al. ...................... 60/581 |
| 4,433,614 | A | * | 2/1984 | Takeuchi et al. ............ 91/376 R |
| 4,522,108 | A | * | 6/1985 | Takeuchi et al. ............ 91/376 R |
| 4,542,680 | A | * | 9/1985 | Takeuchi ....................... 91/369.2 |
| 4,557,179 | A | * | 12/1985 | Takeuchi et al. ............. 91/369.2 |
| 4,655,628 | A | * | 4/1987 | Parker ........................... 403/163 |
| 4,685,299 | A | * | 8/1987 | Myers et al. .................. 60/547.1 |
| 5,221,154 | A | * | 6/1993 | Foulquier et al. ............... 403/12 |
| 5,447,030 | A | * | 9/1995 | Wang et al. ...................... 60/552 |
| 5,518,332 | A | * | 5/1996 | Katoh ........................... 403/155 |
| 6,189,437 | B1 | * | 2/2001 | Morlan .................... 92/165 PR |
| 6,250,642 | B1 | * | 6/2001 | Ciotola ......................... 277/370 |
| 6,314,865 | B1 | * | 11/2001 | Henein et al. ................ 92/169.3 |
| 6,402,262 | B1 | * | 6/2002 | Ersoy et al. ................. 303/114.3 |

(Continued)

FOREIGN PATENT DOCUMENTS

| EP | 0 592 247 A2 | 4/1994 |
| JP | 2004-131064 A | 4/2004 |
| KR | 20080074839 A | 8/2008 |

OTHER PUBLICATIONS

Korean Office Action dated Oct. 8, 2012.

*Primary Examiner* — Paul N Dickson
*Assistant Examiner* — Timothy Wilhelm
(74) *Attorney, Agent, or Firm* — McDermott Will & Emery LLP

(57) ABSTRACT

Disclosed is a booster assembly for vehicles capable of reducing assembly time of a vehicle. The booster assembly includes a booster including a casing having a front shell and a rear shell sealingly coupled to each other and a hollow tube mounted through the casing, a master cylinder including a flange part coupled to the casing, and a mounting bolt inserted through the flange part and the tube in the casing to fix the booster and the master cylinder to a panel of a vehicle body. The tube has a clip slot formed by cutting a circumferential surface of an end portion thereof. The clip slot is coupled with a clip to firmly secure the mounting bolt to the tube.

10 Claims, 5 Drawing Sheets

(56) References Cited

U.S. PATENT DOCUMENTS

| | | |
|---|---|---|
| 6,623,048 B2 * | 9/2003 | Castel et al. ............... 285/382 |
| 6,918,249 B2 * | 7/2005 | Maligne et al. ............... 60/593 |
| 7,051,643 B1 * | 5/2006 | Bianchi et al. ............... 92/169.3 |
| 7,322,269 B2 * | 1/2008 | Faller et al. ............... 91/376 R |
| 7,331,275 B2 * | 2/2008 | Sexton et al. ............... 92/169.3 |
| 7,409,889 B2 * | 8/2008 | Hurwic et al. ............... 74/560 |
| 2009/0321198 A1 * | 12/2009 | Barland ............... 188/264 A |

* cited by examiner

BOOSTER ASSEMBLY FOR VEHICLES

CROSS-REFERENCE TO RELATED APPLICATION

This application claims the benefit of Korean Patent Application No. 2011-0013065, filed on Feb. 15, 2011 in the Korean Intellectual Property Office, the disclosure of which is incorporated herein by reference.

BACKGROUND

1. Field

Embodiments of the present invention relate to a booster assembly for vehicles, in which a booster and a master cylinder may be easily mounted to a vehicle.

2. Description of the Related Art

Generally, a booster for vehicles is an apparatus which creates great braking force with small input force utilizing the pressure difference between the suction pressure of an engine of a vehicle and atmospheric pressure. Accordingly, the booster develops braking force greater than force normally obtained when a brake pedal is depressed.

The booster is mounted to a dashboard of a vehicle body using a mounting bolt penetrating a sealed case of the booster.

The booster is first located in an engine room of the vehicle body, and the mounting bolt is pushed into a through-hole formed at the case of the booster so that an end portion of the mounting bolt passes through the dashboard and enters a passenger compartment. Then, the end portion of the mounting bolt is screwed into a nut disposed in the passenger compartment, thereby engaging the booster and a bracket of a brake pedal with each other.

SUMMARY

It is an aspect of the present invention to provide a booster assembly for vehicles capable of shortening time for mounting a booster to a vehicle body.

Additional aspects of the invention will be set forth in part in the description which follows and, in part, will be obvious from the description, or may be learned by practice of the invention.

In accordance with one aspect of the present invention, a booster assembly for vehicles includes a booster including a casing having a front shell and a rear shell sealingly coupled to each other and a hollow tube mounted through the casing, a master cylinder including a flange part coupled to the casing, and a mounting bolt inserted through the flange part and the tube in the casing to fix the booster and the master cylinder to a panel of a vehicle body. The tube has a clip slot formed by cutting a circumferential surface of an end portion thereof, and the clip slot is coupled with a clip to firmly secure the mounting bolt to the tube.

The flange part may be formed with a recess to receive the clip therein.

The clip may include a base portion fixedly received in the recess, an elastic bent portion bent upwards from an end of the base portion, and a pressing portion extending from an end of the elastic bent portion and inserted through the clip slot.

The mounting bolt may include a head part and a shaft part, and the shaft part may have a protrusion formed on a portion of an outer circumferential surface thereof in a circumferential direction.

The booster assembly for vehicles may further include a pedal bracket mounted to the panel of the vehicle body, to which a brake pedal is coupled. The pedal bracket may be integrally provided with a nut, and the mounting bolt may be screwed into the nut.

In accordance with another aspect of the present invention, a booster assembly for vehicles includes a dashboard mounted to a vehicle body, the dashboard partitioning an engine room and a passenger compartment from each other, a booster and a master cylinder coupled to the dashboard in a space of the engine room, a pedal bracket coupled to the dashboard in a space of the passenger compartment, the pedal bracket being integrally provided with a nut, a mounting bolt inserted through the booster and the master cylinder in the space of the engine room, the mounting bolt being screwed into the nut of the pedal bracket, a tube mounted through the booster so that the mounting bolt is inserted through the tube, the tube having a clip slot formed by cutting a surface of an end portion thereof by a certain length in a circumferential direction, and a clip coupled to the clip slot to firmly secure the mounting bolt to the tube by pressing a circumferential surface of the mounting bolt.

The mounting bolt may include a head part and a shaft part extending from the head part. The shaft part may have screw threads formed at an end portion thereof to be screwed into the nut, and a protrusion formed at a circumferential surface thereof to be caught by the clip when the shaft part moves in a direction of escaping from the tube, thereby preventing the mounting bolt from totally escaping from the tube.

The clip may include a base portion, an elastic bent portion bent upwards from an end of the base portion, and a pressing portion extending from an end of the elastic bent portion and inserted through the clip slot.

As described above, the booster assembly for vehicles according to the aspects of the present invention provides ease and simplicity in mounting the booster assembly to a vehicle body, thereby enhancing work efficiency.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
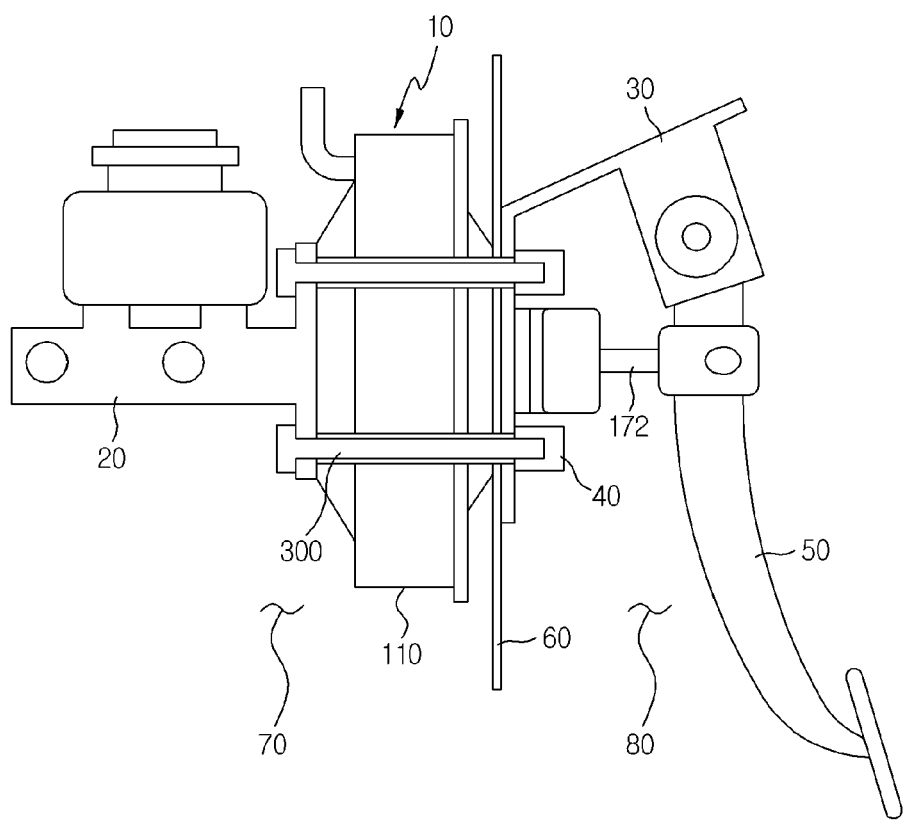
FIG. 1 is a schematic view showing a booster assembly for vehicles according to an embodiment of the present invention.

Reference will now be made in detail to the embodiments of the present invention, examples of which are illustrated in the accompanying drawings, wherein like reference numerals refer to like elements throughout.

Figure 2:
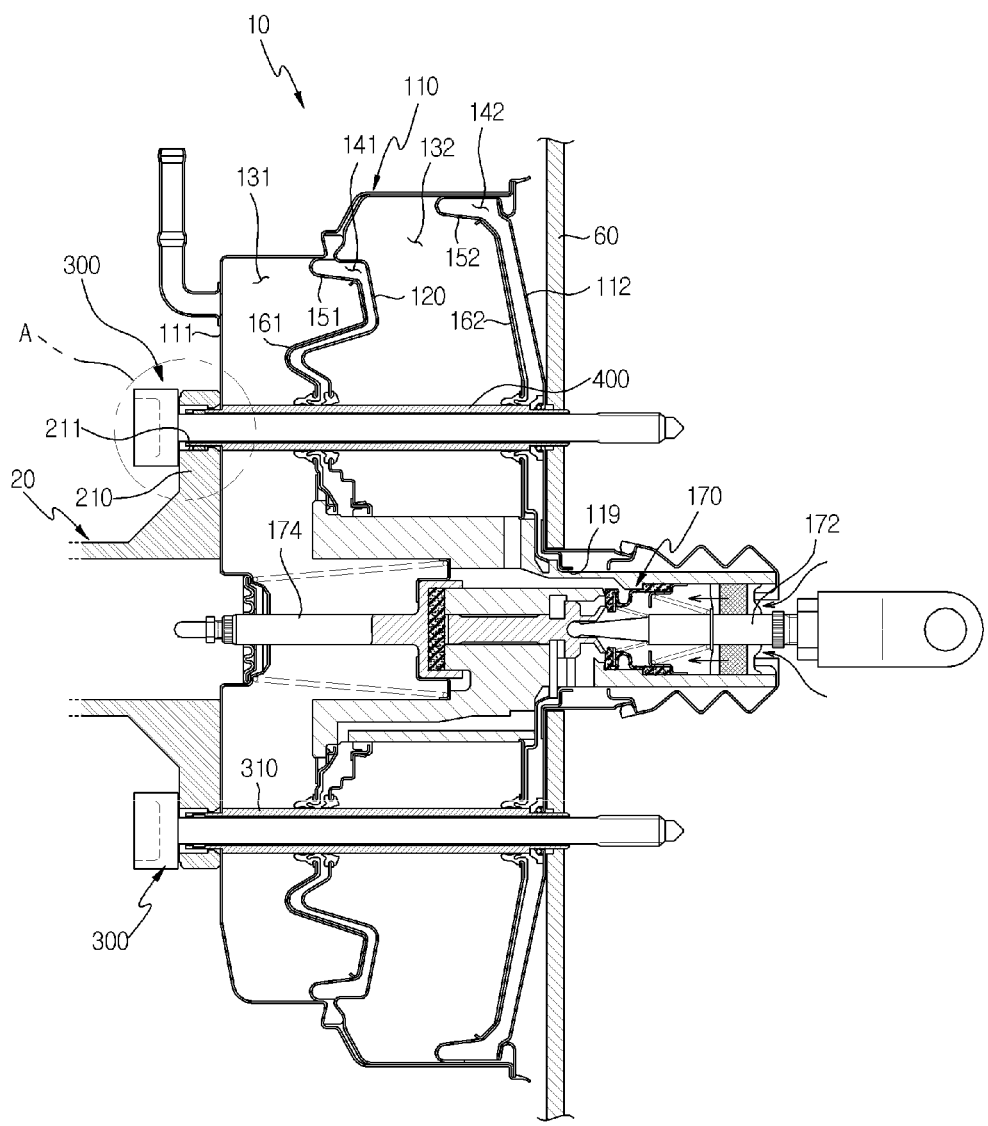
FIG. 2 is a sectional view showing a booster of the booster assembly for vehicles according to the embodiment of the present invention.

FIG. 1 is a schematic view showing a booster assembly for vehicles according to an embodiment of the present invention, and FIG. 2 is a sectional view showing a booster of the booster assembly for vehicles according to the embodiment of the present invention.

As shown in FIG. 1, a booster assembly for vehicles according to an embodiment of the present invention includes a booster 10 to create great output force with small input force, and a master cylinder 20 to convert the force generated from the booster 10 into hydraulic force.

The booster 10 and the master cylinder 20 are disposed in an engine room 70 of a vehicle body and mounted to a dashboard 60 using a mounting bolt 300. The dashboard 60 partitions the engine room 70 from a passenger compartment 80.

In the passenger compartment 80 are disposed a brake pedal 50 and a pedal bracket 30 to which the brake pedal 50 is mounted. The pedal bracket 30 is mounted to the dashboard 60 and integrally provided with a nut 40 into which the mounting bolt 300 is screwed. The nut 40 may be welded to the pedal bracket 30.

The mounting bolt 300 penetrates the booster 10 and the dashboard 60, and an end portion thereof is screwed into the nut 40 provided at the pedal bracket 30, thereby fixing the master cylinder 20 and the booster 10 to the dashboard 60.

As shown in FIG. 2, the booster 10 includes a casing 110 which consists of a front shell 111 and a rear shell 112 sealingly coupled to each other, and a partition plate 120 partitioning an inner space of the casing 110 into a front chamber and a rear chamber. The front chamber and the rear chamber are respectively divided into constant-pressure chambers 131 and 132 and varying-pressure chambers 141 and 142 by diaphragms 151 and 152 and power pistons 161 and 162.

The casing 110 is formed with an opening 119 at a central portion of a rear side thereof. A valve device 170 including an input shaft 172 and an output shaft 174 is mounted through the opening 119 of the casing 110. As the input shaft 172 moves forward and backward by manipulation on the brake pedal 50, the constant-pressure chambers 131 and 132 and the varying-pressure chambers 141 and 142 communicate with each other or the varying-pressure chambers 141 and 142 communicate with atmosphere to create a pressure difference between the constant-pressure chambers 131 and 132 and the varying-pressure chambers 141 and 142. The pressure difference is transmitted to the output shaft 174, and subsequently the output shaft 174 pushes a piston (not shown) of the master cylinder 20 fixed to a front side of the front shell 111, thereby creating braking force.

The master cylinder 20 is formed in a cylindrical shape having two ends, one of which is closed and the other of which is opened. The master cylinder 20 is configured to generate hydraulic force using the force transmitted through the output shaft 174. Since the master cylinder 20 is well known in the related art, a detailed description thereof will be omitted.

The master cylinder 20 includes a flange part 210 designed to engage the master cylinder 20 with the booster 10 using the mounting bolt 300. Also, the flange part 210 is formed with a recess 211 to connect the flange part 210 to a tube 400 (which will be described later). The recess 211 of the flange part 210 will also be described later.

The booster 10 and the master cylinder 20 are mounted to the dashboard 60 partitioning the engine room 70 and the passenger compartment 80 from each other. The input shaft 172 and a rear end portion of the valve device 170 are introduced into the passenger compartment 80 through the dashboard 60 so as to connect the input shaft 172 to the brake pedal 50. The booster 10 and the master cylinder 20 are disposed in the engine room 70 and fixed to the dashboard 60 using the mounting bolt 300.

Figure 3:
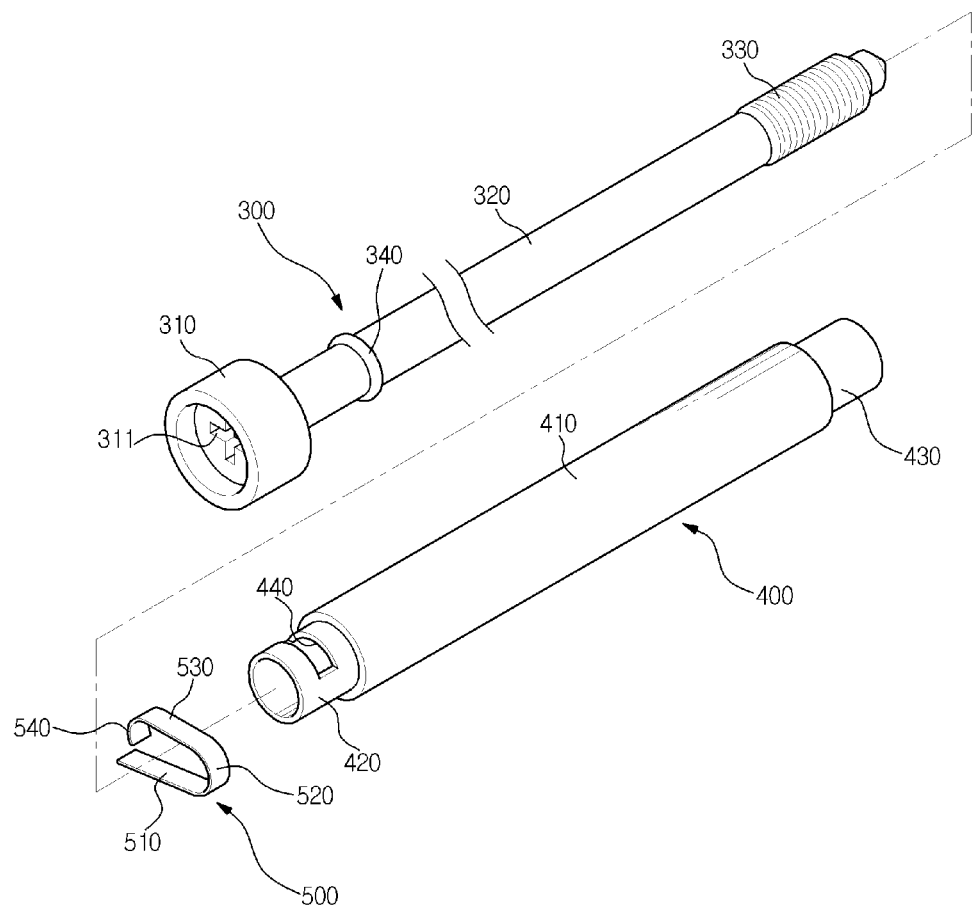
FIG. 3 is a perspective view showing essential parts of a fastening structure using a mounting bolt of the booster assembly for vehicles according to the embodiment of the present invention.
Figure 4:
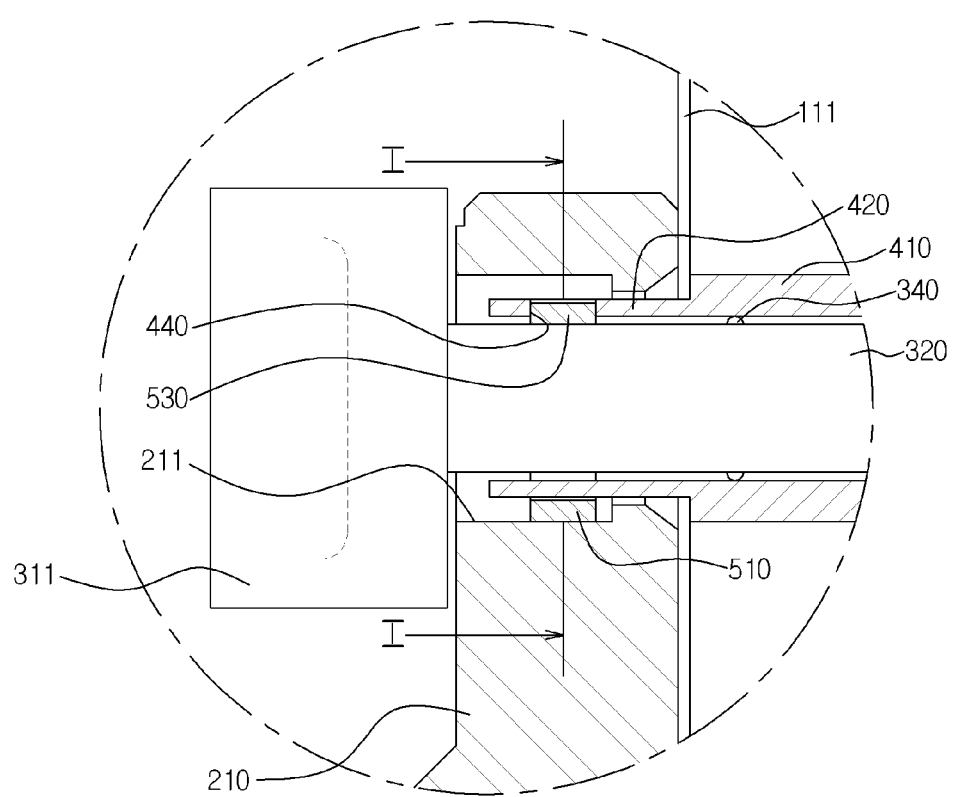
FIG. 4 is an enlarged view of a portion A in FIG. 2.
Figure 5:
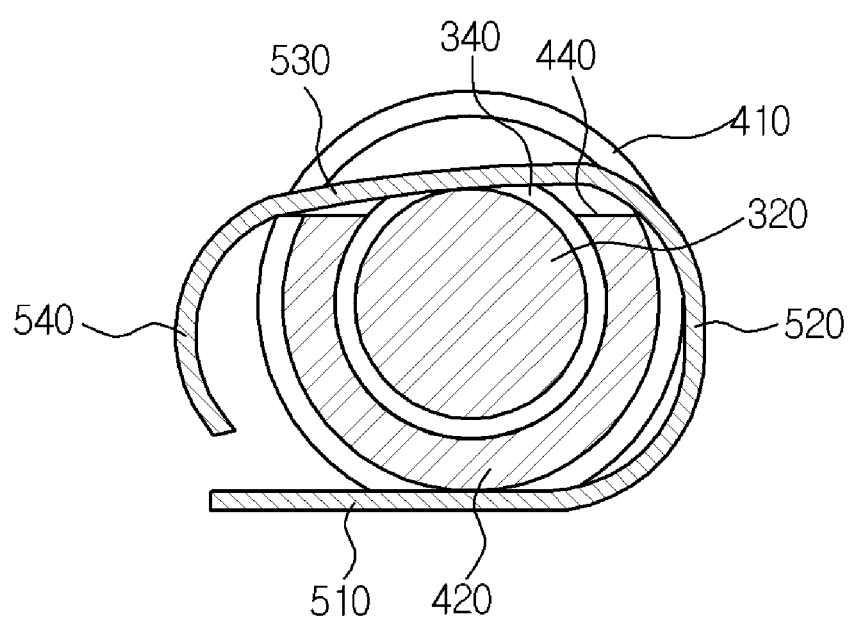
FIG. 5 is a sectional view taken along line I-I in FIG. 4.

The fastening structure using the mounting bolt to mount the master cylinder and the booster to the dashboard will now be explained. FIG. 3 is a perspective view showing essential parts of the fastening structure using the mounting bolt of the booster assembly for vehicles according to the embodiment of the present invention, FIG. 4 is an enlarged view of a portion A in FIG. 2, and FIG. 5 is a sectional view taken along line I-I in FIG. 4.

Referring to FIG. 2 through FIG. 5, the mounting bolt 300 includes a head part 310 and a shaft part 320 extending from the head part 310. The shaft part 320 has a smaller diameter than the head part 310. The shaft part 320 passes through the flange part 210 of the master cylinder 20 and the casing 110 of the booster 10.

The head part 310 is formed with a cross-shaped recess 311 to rotate the mounting bolt 300. The shaft part 320 is formed with screw threads 330 at an end portion thereof, which are screwed into the nut 40 provided at the pedal bracket 30.

The booster 10 further includes a tube 400 mounted to the casing 110, through which the shaft part 320 of the mounting bolt 300 is inserted. The tube 400 has a certain length and is formed in a hollow cylindrical shape having a space defined therein in a longitudinal direction.

The tube 400 includes a large-diameter part 410 disposed in the casing 110 and small-diameter parts 420 and 430 respectively formed at both ends of the large-diameter part 410. Each of the small-diameter parts 420 and 430 has a smaller diameter than the large-diameter part 410.

The small-diameter parts 420 and 430 are coupled to the front shell 111 and the rear shell 112 of the casing 110, respectively, and protrude outwards therefrom.

The small-diameter part 420 coupled to the front shell 111 has a clip slot 440 formed by cutting a surface thereof by a certain length in a circumferential direction. A clip 500 is coupled to the clip slot 440 in order to firmly secure the mounting bolt 300 to the tube 400 after the mounting bolt 300 is inserted through the tube 400.

The clip 500 is formed in a plate shape. The clip 500 includes a base portion 510, an elastic bent portion 520 which is bent upwards by a certain curvature from an end of the base portion 510, a pressing portion 530 which extends from an end of the elastic bent portion 520, and a downwardly bent portion 540 which is bent downwards from an end of the pressing portion 530. The base portion 510 is fixedly received in the recess 211 formed at the flange part 210 of the master cylinder 20. The pressing portion 530 is inserted through the clip slot 440 and elastic force is applied thereto by the elastic bent portion 520, thereby pressing a circumferential surface of the mounting bolt 300 inserted through the tube 400. The downwardly bent portion 540 is designed to prevent the clip 500 from separating from the small-diameter part 420 of the tube 400.

The fastening structure of the clip 500 and the mounting bolt 300 for mounting the master cylinder 20 to the booster 10 provides reduction in assembly time in comparison with a fastening structure of nuts and bolts. Also, since the booster 10 and the master cylinder 20 can be secured to each other by inserting the mounting bolt 300 through the tube 400, work efficiency is enhanced.

Also, since the tube 400 according to this embodiment does not need to have screw threads for engagement with the mounting bolt 300, a diameter of the tube 400 may be reduced. Accordingly, a weight and manufacturing cost of the tube 400 may be reduced, thereby improving productivity.

The mounting bolt 300 further includes a protrusion 340 formed on a portion of an outer circumferential surface of the shaft part 320 in a circumferential direction of the shaft part 320.

While the master cylinder 20 and the booster 10 engaged with each other by the mounting bolt 300 are transferred to be mounted to a vehicle body, the mounting bolt 300 may move in a direction of escaping from the tube 400 due to slippage between the mounting bolt 300 and the tube 400. However, in such a case, the protrusion 340 of the mounting bolt 300 is caught by the pressing portion 530 of the clip 500, thereby preventing the mounting bolt 300 from totally escaping from the tube 400. Therefore, there is no need for an additional device to prevent separation of the mounting bolt 300 during the process of transferring the master cylinder 20 and the booster 10.

The master cylinder 20 and the booster 10 engaged with each other by the mounting bolt 300 are transferred into the engine room 70 and located at a position corresponding to the pedal bracket 30 coupled to the dashboard 60. If a worker rotates the mounting bolt 300 using a tool, the end portion of the mounting bolt 300 is screwed into the nut 40 provided at the pedal bracket 30, thereby securely fastening the master cylinder 20, the booster 10 and the pedal bracket 30.

Accordingly, since a worker only needs to access the engine room 70 when performing assembly tasks, assembly time of vehicles may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A booster assembly for vehicles comprising:
a booster including a casing having a front shell and a rear shell sealingly coupled to each other, and a hollow tube mounted through the casing;
a master cylinder including a flange part coupled to the casing; and
a mounting bolt inserted through the flange part and the tube in the casing to fix the booster and the master cylinder to a panel of a vehicle body,
wherein the tube has a clip slot formed outside of the casing by cutting a circumferential surface of an end portion thereof, and the clip slot is coupled with a clip to firmly secure the mounting bolt to the tube.

2. The booster assembly for vehicles according to claim 1, wherein the flange part is formed with a recess to receive the clip therein.

3. The booster assembly for vehicles according to claim 2, wherein the clip includes a base portion fixedly received in the recess, an elastic bent portion bent upwards from an end of the base portion, and a pressing portion extending from an end of the elastic bent portion and inserted through the clip slot.

4. The booster assembly for vehicles according to claim 3, wherein the mounting bolt includes a head part and a shaft part, and wherein
the shaft part has a protrusion formed on a portion of an outer circumferential surface thereof in a circumferential direction.

5. The booster assembly for vehicles according to claim 4, further comprising:
a pedal bracket mounted to the panel of the vehicle body, to which a brake pedal is coupled, wherein
the pedal bracket is integrally provided with a nut, and the mounting bolt is screwed into the nut.

6. A booster assembly for vehicles comprising:
a dashboard mounted to a vehicle body, the dashboard partitioning an engine room and a passenger compartment from each other;
a booster and a master cylinder coupled to the dashboard in a space of the engine room;
a pedal bracket coupled to the dashboard in a space of the passenger compartment, the pedal bracket being integrally provided with a nut; a mounting bolt inserted through the booster and the master cylinder in the space of the engine room, the mounting bolt being screwed into the nut of the pedal bracket;
a tube mounted through the booster so that the mounting bolt is inserted through the tube, the tube having a clip slot formed outside a casing of the booster by cutting a surface of an end portion thereof by a certain length in a circumferential direction; and
a clip coupled to the clip slot to firmly secure the mounting bolt to the tube by pressing a circumferential surface of the mounting bolt.

7. The booster assembly for vehicles according to claim 6, wherein the mounting bolt includes a head part and a shaft part extending from the head part, and wherein
the shaft part has screw threads formed at an end portion thereof to be screwed into the nut, and a protrusion formed at a circumferential surface thereof to be caught by the clip when the shaft part moves in a direction of escaping from the tube, thereby preventing the mounting bolt from totally escaping from the tube.

8. The booster assembly for vehicles according to claim 6, wherein the clip includes a base portion, an elastic bent portion bent upwards from an end of the base portion, and a pressing portion extending from an end of the elastic bent portion and inserted through the clip slot.

9. The booster assembly for vehicles according to claim 1, wherein the clip engages the mounting bolt.

10. The booster assembly for vehicles according to claim 6, wherein the clip engages the mounting bolt.

* * * * *